United States Patent [19]

Matusita et al.

[11] Patent Number: 4,754,923

[45] Date of Patent: Jul. 5, 1988

[54] SPRAY GUN WITH AUTOMATIC VALVE OPENING CONTROL MEANS

[75] Inventors: Yoshio Matusita; Takeshi Mochizuki; Yukimitu Watanabe; Ikuya Shiraishi; Katsumasa Iwasawa, all of Kanagawa; Kazuki Terafuji, Hiroshima, all of Japan

[73] Assignee: Iwata Air Compressor Mfg. Co., Ltd., Tokyo, Japan

[21] Appl. No.: 896,204

[22] Filed: Aug. 14, 1986

[30] Foreign Application Priority Data

Aug. 22, 1985 [JP] Japan ................................ 60-184645
Aug. 23, 1985 [JP] Japan ................................ 60-185638

[51] Int. Cl.[4] ............................................. A01G 27/00
[52] U.S. Cl. ........................................ 239/68; 239/67; 239/73; 239/407; 239/412; 118/300; 118/697
[58] Field of Search ....................... 118/300, 685, 697; 239/407, 412, 413, 69, 73, 68, 67

[56] References Cited

U.S. PATENT DOCUMENTS

| | | | |
|---|---|---|---|
| 3,235,186 | 2/1966 | Boyce | 239/415 |
| 3,933,312 | 1/1976 | Fries | 239/413 |
| 4,154,403 | 5/1979 | Forrester | 239/73 |
| 4,159,082 | 6/1979 | Luderer et al. | 239/412 |
| 4,660,771 | 4/1987 | Chabert et al. | 239/69 |

FOREIGN PATENT DOCUMENTS

| | | | |
|---|---|---|---|
| 0212442 | 3/1987 | European Pat. Off. | 239/412 |
| 0213535 | 3/1987 | European Pat. Off. | 239/73 |
| 3236647 | 4/1984 | Fed. Rep. of Germany | 118/300 |

*Primary Examiner*—Kenneth J. Dorner
*Assistant Examiner*—Gerald A. Anderson
*Attorney, Agent, or Firm*—Wenderoth, Lind & Ponack

[57] ABSTRACT

A spray gun with an automatic valve opening control means which enables remote and stepless control of a paint spraying operation has atomizing means provided at the front end thereof, a paint valve member which enables adjustment of the amount of paint jetted out from the atomizing means, and a spray pattern adjusting valve member adapted to adjust the spray pattern by controlling the amount of compressed air jetted out from the atomizing means. A threaded slider mechanism is provided on the proximal portion of a valve body of either the paint valve member or the spray pattern adjusting valve member (or both). A servo motor and an encoder are connected to a drive screw member of the threaded slider mechanism. The encoder is adapted to detect the rotational position of the servo motor and output a controlled variable of the motor, and the servo motor is controlled in response to an external signal.

4 Claims, 2 Drawing Sheets

SPRAY GUN WITH AUTOMATIC VALVE OPENING CONTROL MEANS

BACKGROUND OF THE INVENTION

1. Field of the Invention

The present invention relates to a spray gun with an automatic valve opening control means which enables remote and stepless control of a paint spraying operation in response to an external signal.

2. Description of the Related Art

A typical conventional spray gun which is controlled by external signals has heretofore been arranged such that a necessary number of control valves are disposed in each of the paint and air systems in the spray gun, and the valves are set in different conditions in advance and are opened and closed as well as being selectively combined with each other in response to external signals, thereby allowing the amount of paint sprayed and the spray pattern width to be controlled such as to meet particular spraying conditions such as the configuration, size, etc. of various kinds of object (see, e.g., the specification of Japanese Utility model Public disclosure No. 48769/1984 which was previously filed by the applicant of this application). This type of conventional spray gun suffers, however, from the following problems. Since the range of control of the amount of paint sprayed and the spray pattern width is limited by the number of control valves provided, the range of use of the spray gun is inconveniently limited. In addition, since each control valve has an arrangement similar to that of the spray gun itself (see the specifictation of Japanese Utility Model Public Disclosure No. 48764/1984 filed by the same applicant of this invention), the cost of the spray gun as a whole is unfavorably high.

Further, the above-described conventional spray gun involves certain difficulties in terms of speedily and accurately transmitting to atomizing means a flow rate determined by a control valve which is remote from the atomizing means due to possible residual pressure of paint or compressed air, which means that the response speed and sensitivity are unsatisfactory.

SUMMARY OF THE INVENTION

In view of the above-described circumstances, it is a primary object of the present invention to provide a spray gun so designed that each valve is directly activated by means of a servo motor, thereby enabling stepless control of the flow rate of a fluid and obtaining stable performance which is independent of the length of the hose used, the internal resistance and other similar factors.

To this end, the present invention provides a spray gun having atomizing means provided at the front end thereof, a paint valve member which enables adjustment of the amount of paint jetted out from the atomizing means, and a spray pattern adjusting valve member adapted to adjust the spray pattern by controlling the amount of compressed air jetted out from the atomizing means, in which a threaded slider mechanism is provided so as to activate a valve body of either the paint valve member or the spray pattern adjusting valve member or both, and a servo motor and an encoder are connected to a drive screw member of the threaded slider mechanism, the encoder being adapted to detect the rotational position of the servo motor and output a controlled variable of the motor.

BRIEF DESCRIPTION OF THE DRAWINGS

The above and other objects, features and advantages of the present invention will become more apparent from the following description of preferred embodiments thereof, taken in conjunction with the accompanying drawings, in which.

DESCRIPTION OF THE PREFERRED EMBODIMENTS

Figure 1:
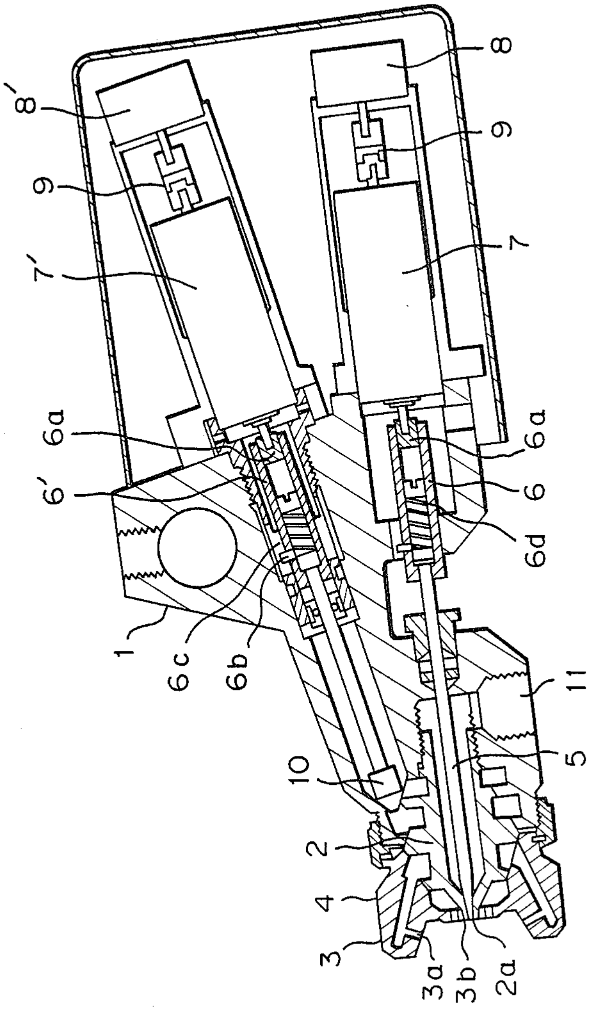
FIG. 1 is a sectional view of a spray gun in accordance with one embodiment of the present invention.

Referring first to FIG. 1, in this embodiment a spray gun main body 1 has an atomizing means 4 at the front end thereof. The atomizing means 4 is composed of a paint nozzle 2 and an air cap 3. A paint valve member in this embodiment a needle valve 5, is provided in the center of the gun main body 1 in such a manner that the pointed end of the valve 5 extends into the center of the paint nozzle 2. A threaded slider 6 is provided at the rear end of the needle valve 5, and a drive shaft of a servo motor 7 is secured to a drive screw member *6a* provided at the rear end of the threaded slider 6. In addition, an encoder 8 is connected to the rear end of the servo motor 7 through a coupling 9, the encoder 8 being adapted to detect the rotational position of the motor 7 and output a controlled variable thereof. Similarly, a spray pattern adjusting valve 10 is provided in such a manner that the pointed end thereof extends into the center of the air cap 3. A threaded slider 6' is provided at the rear end of the valve 10, and a drive shaft of a servo motor 7' is secured to a drive screw member *6a* of the threaded slider 6'. An encoder 8' is connected to the rear end of the servo motor 7' through a coupling 9'. The threaded sliders 6 and 6' are arranged as follows. A thread *6d* is cut in the inner periphery of the slider 6 (6'), and a pin *6b* projects from the outer periphery thereof and is engaged with a groove *6c* axially provided in the main body 1 or a guide so that the slider 6 (6') is slidable in the axial direction alone. The drive screw member *6a* is in thread engagement with the thread *6d* formed in the slider 6 (6') and is activated in response to the rotation of the servo motor 7 (7') so as to move the slider 6 (6') in the axial direction thereof.

The following is a description of the operation of the above-described arrangement.

In response to external signals (either digital or analog), a control means (not shown) outputs the respective positions of the needle valve 5 and the spray pattern adjusting valve 10. The relationship between external signals and these positions are predetermined. In consequence, the servo motors 7 and 7' are caused to rotate, thus causing the valves 5 and 10 to move in response to the rotational motions of the motors 7 and 7', respectively. The valve opening positions (present positions) of the valves 5 and 10 are respectively fed back to the control means through the encoders 8 and 8' connected to the servo motors 7 and 7', whereby the valves 5 and 10 are controlled such that an optimal position and direction of movement of each valve (the direction of movement is determined by the rotational direction of the corresponding servo motor) are obtained at all times.

Thus, the needle valve 5 and the spray pattern adjusting valve 10 are respectively set at predetermined positions, thereby allowing a given spraying operation to be conducted under optimal control at all times.

The spray pattern adjusting valve 10 is adapted to vary the spray pattern by controlling the amount of air jetted out from a side air nozzle port *3a* formed in the air cap 3 in a manner similar to that of conventional spray guns. Accordingly, when the spray pattern adjusting valve 10 is closed, the spray pattern is circular and has a minimum pattern width, whereas, when the valve 10 is fully opened, a spray pattern with a maximum width is formed.

The paint which is supplied from a paint inlet port 11 is jetted out from a nozzle port *2a* of the paint nozzle 2 and formed into a predetermined spray pattern by virtue of the air jetted out from the central and side air nozzle ports *3b* and *3a* of the air cap 3.

As described above, the spray gun with an automatic valve opening control means according to the present invention has an arrangement in which the flow rates of paint and air are controlled in a stepless manner by means of the servo motors provided for the control valves, respectively. It is therefore possible to speedily set optimal spray conditions which conform with the configuration of any object at any time during a spraying operation, so that the response speed and sensitivity are improved, and the paint can be used efficiently without waste, thus permitting a reduction in costs.

In addition, it is possible to effect stepless control of the amount of paint sprayed and the spray pattern width, which enables a delicate painting operation. Further, the amount of paint sprayed and the spray pattern width can be adjusted as desired by remote control. In addition, the production cost of the apparatus is lowered, and the size of the apparatus as a whole is reduced as compared with the prior art.

It should be noted that, although both the needle valve and the spray pattern adjusting valve are controlled in the above-described embodiment, it will be clear that the aforementioned object of the present invention can be attained by an arrangement in which only one of the two valves is controlled.

Figure 2:
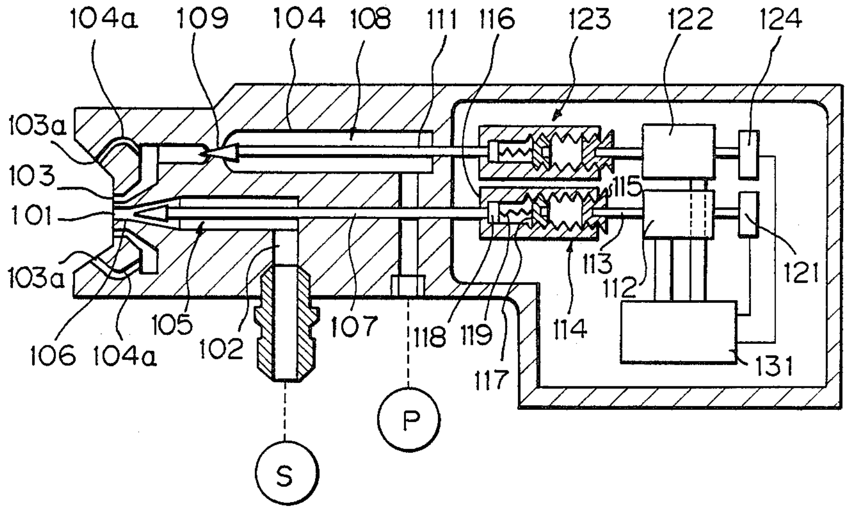
FIG. 2 is a sectional view of a spray gun in accordance with another embodiment of the present invention.
Figure 3:
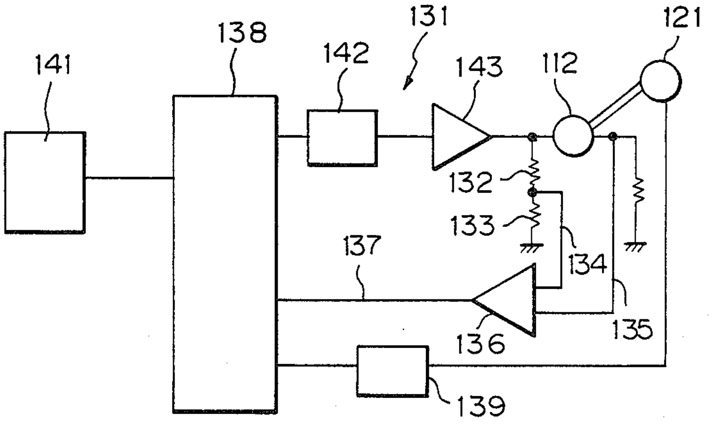
FIG. 3 is a diagram of a control circuit employed in the spray gun shown in FIG. 2.

In the above-described embodiment shown in FIG. 1, the respective zero points of the needle valve 5 and the spray pattern adjusting valve 10 are immovable or fixed. This involves some risk of fluid leaking out when these valves and the valve seats associated therewith become worn. FIGS. 2 and 3 show in combination another embodiment of the present invention, in which the zero point of each valve is variable in accordance with the degree to which the valve seats and the valve members have become worn.

FIG. 2 is a vertical sectional view of a spray gun which has a paint nozzle port 101 and a paint supply passage 102 which is communicated with the nozzle port 101. The paint supply passage 102 is communicated with a paint supply source S. An air nozzle port 103 is formed around the paint nozzle port 101, and a compressed air supply passage 104 is communicated with the air nozzle port 103. An air compressor P is connected to the air supply passage 104. A spray pattern adjusting air passage **104*a* branches off from the air supply passage 104 and extends to a spray pattern adjusting air nozzle port 103*a*. Thus, the spray pattern is changed in accordance with the pressure of the air jetted out from this air nozzle port 103*a*. A valve flow rate control means 105 for controlling the flow rate of paint is provided within the paint supply passage 102. The means 105 has a valve seat 106 which is formed in close proximity with the paint nozzle port 101, and a paint valve member 107 which in this embodiment is in the form of a needle valve which is provided in such a manner as to be movable toward and away from the valve seat 106. Similarly, a valve flow rate control means 108 for air is provided within the air supply passage 104, the valve means 108 in this embodiment having a valve seat 109 and a valve member 111** in the form of a needle valve.

The valve flow rate control means 105 further has a servo motor 112, and an output shaft 113 of the motor 112 and the valve member 107 are operatively connected by a transmission means 114. The transmission means 114 includes a drive screw member 115 keyed to the output shaft 113 of the servo motor 112, and a threaded slider 116 having an internal thread which is engaged with an external thread formed on the screw member 115. The threaded slider 116 is allowed to move in the longitudinal direction thereof but is prevented from rotating as in the case of that employed in the embodiment shown in FIG. 1. Accordingly, the threaded slider 116 moves in the axial direction of the output shaft 113 in response to the rotation of the shaft 113. A setscrew 117 is screwed into the threaded slider 116, and a compression spring 119 is disposed between the setscrew 117 and an enlarged head portion 118 formed at the rear end of the valve member 107 and accommodated within the threaded slider 116. Accordingly, when the motor 112 further rotates in the valve closing direction after the valve member 107 has come into contact with the valve seat 106, the resistance against the motor 112 does not increase suddenly, but the threaded slider 116 moves axially against the force from the spring 119, thus allowing the resistance against the motor 112 to increase gradually. The output shaft 113 of the motor 112 is further connected to an encoder 121 which generates a pulse every time the output shaft 113 turns through a predetermined rotational angle. The encoder 121 constitutes a part of means for detecting the position of the valve member 117, as will be described later.

The other flow rate control valve means 108 also has servomotor 122, a transmission means 123 and an encoder 124. The arrangements and functions of these members are the same as those of the servo motor 112, the transmission means 114 and the encoder 121, and the description thereof is therefore omitted.

The servo motor 112 is connected to a control circuit 131 so that the rotation thereof is controlled by this circuit 131. The control circuit 131 is shown in FIG. 3 in detail. The operation of the value flow rate control means will be described below while explaining the arrangement and operation of the control circuit 131 shown in FIG. 3. It should be noted that, since the control circuit 131 functions in the same manner with respect to both of the means 105 and 108, the operation of the control circuit 131 with respect to the means 105 alone will be explained below.

A reference voltage setting line 134 is connected to a power supply circuit for the motor 112 through resistors 132 and 133 which are appropriately selected. A consumed power detecting line 135 is led out from the other side of the motor 112. On the line 135 is generated a signal which is proportional to the current which varies in accordance with the torque of the motor 112. The lines 134 and 135 are connected to a comparator 136. This comparator 136 is adapted to output a zero point setting signal to a line 137 when the torque of the motor 112 reaches a predetermined constant value. The zero point setting signal also serves as a command signal for stopping the motor 112. In response to this signal, a control means 138 cuts off the power supply to the motor 112 so as to stop the rotation of the motor 112. The number of pulses output from the encoder 121 is counted by an up/down counter 139. A positional signal which represents the count, i.e., the present position of the motor 112 is delivered from the counter 139 to the control means 138. Thus, in this embodiment the encoder 121 and the counter 139 constitute in combination position detecting means for detecting the position of the valve member 107.

The reference numeral 141 denotes an input means from which a signal for determining the degree of opening of the valve member 107 is given to the control means 138. For example, when the spray gun in this embodiment is of the type wherein the distance between the spray gun and an object is measured and the respective flow rates of paint and air are varied in accordance with the measured value, the input means is a distance measuring means which gives a signal corresponding to the measured distance to the control means 138, and the control means 138 calculates an optimal valve opening from this distance signal and in accordance with a program which has been set in advance on the basis of various data. The input means 141 may be a device which is adapted such that an operator inputs a signal representing a required degree of valve opening at any time during a spraying operation, or may be a device which is arranged such that changes in the valve opening are programmed in advance and a valve opening signal is continuously applied to the control means 138.

When the main switch (not shown) of the spray gun is turned on to start the operation thereof, the control means 138 activates the motor 112 through a D/A converter 142 and a power amplifier 143 so that the motor 112 is rotated in the valve closing direction. When the pressure with which the valve member 107 is in contact with the valve seat 106 reaches a predetermined value, that is, when the torque of the motor 112 reaches a predetermined value, the motor 112 is stopped in response to a zero point setting signal generated from the comparator 136 and, at the same time, the counter 139 is cleared. Accordingly, when the valve member 107 is in contact with the valve 106 with a predetermined pressure, the counter 139 is set to zero, and the zero point of the position detecting means is thereby set. It should be noted that the setting of the zero point may be effected in such a manner that the contents or count of the counter 139 at the time when the control means 138 receives the zero point setting signal is treated as the zero point and stored in a memory provided in the control means 138, and thereafter, displacement of the valve member 107 is calculated on the basis of the stored value.

After the zero point has been set, the control means 138 calculates the amount of displacement of the valve member 107 from a valve opening command signal and on the basis of the newly set zero point and activates the motor 112 on the basis of the calculated displacement amount of the valve member 107 through the D/A converter 142 and the power amplifier 143. More specifically, when the degree of wear "a" of the valve means 105 is reached, the position at which the valve member 107 is set in response to a particular valve opening signal shifts toward the valve seat 106 by a distance "a" from the position at which the valve member 107 would have been set if the valve means 105 had not become worn.

It should be noted that, although in the above-described embodiment the motor 112 is a servo motor and is controlled such as to stop at a desired rotational position through the encoder 121, the arrangement may be such that a stepping motor is employed and directly controlled such as to stop at a desired rotational position without using an encoder. In such case, a device which counts the number of pulses input to the stepping motor constitutes the position detecting means. If variable resistors are employed as the resistors 132 and 133, the pressure with which the valve member 107 is in contact with the valve seat 106 at the zero point can be adjusted. In addition, the setting of the zero point may be effected not only when the main switch is turned on but also every time a command is generated so as to set the degree of valve opening at zero. Alternatively, the arrangement may be such that the operator inputs a zero point setting command when necessary.

As has been described above, the valve flow rate control means in accordance with the present invention involves no risk of fluid leaking out even when the valve seat and the valve member have become worn, and there is no risk of an actual valve opening undesirably differing with respect to the same valve opening command after the valve means has become worn. Thus, it is possible, according to the present invention, to accurately control the flow rates of paint and air.

Although the present invention has been described through specific terms, it should be noted here that the described embodiment are not necessarily limitative, and various changes and modifications may be imparted thereto without departing from the scope of the invention which is limited solely by the appended claims.

What is claimed is:

1. A spray gun having atomizing means providing at the front end thereof, a paint valve member which enables adjustment of the amount of paint jetted out from said atomizing means, and a spray pattern adjusting valve means adapted to adjust the spray pattern by controlling the amount of compressed air jetted out from said atomizing means, characterized in that the spray gun also has valve flow rate control means which comprises:

a threaded slider mechanism provided on the proximal portion of a valve body of at least one of said paint valve member and said spray pattern adjusting valve means; and a servo motor and an encoder which are connected to a drive screw member of said threaded slider mechanism, said encoder being adapted to detect the rotational position of said servo motor and output a controlled variable of said motor, and said servo motor being controlled in response to an external signal.

2. A spray gun with valve flow rate control means having: a valve seat; a valve member movable to a valve closing position where it is seated on said valve seat, and also movable away from said valve seat; a motor for activating said valve member; transmission means for transmitting the motion of the output shaft of said motor to said valve member; position detecting means for detecting the position of said valve member; and control means including means for establishing a zero point position of said valve means when the torque of said motor exceeds a predetermined value and for activating said motor in response to a command signal for driving said motor to move said valve member a distance from said zero point corresponding to the desired degree of opening of said valve member.

3. A spray gun according to claim 2, wherein said transmission means has a spring which is provided in such a manner as to allow said motor to further rotate in the valve closing direction after said valve member has come into contact with said valve seat.

4. A spray gun according to claim 2, wherein said transmission means includes a drive screw member secured to the output shaft of said motor and having an external thread, a threaded slider having an internal thread which is engaged with the external thread on said screw member, and means for connecting said threaded slider to said valve member.

* * * * *